(12) United States Patent
Blenke et al.

(10) Patent No.: US 7,971,526 B2
(45) Date of Patent: Jul. 5, 2011

(54) EMBOSSING OR BONDING DEVICE CONTAINING FACETTED IMPRESSION ELEMENTS

(75) Inventors: Timothy J. Blenke, Neenah, WI (US); Daniel R. Schlinz, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 352 days.

(21) Appl. No.: 11/405,261

(22) Filed: Apr. 17, 2006

(65) Prior Publication Data

US 2007/0240586 A1   Oct. 18, 2007

(51) Int. Cl.
*B41F 19/02* (2006.01)
*B44B 5/02* (2006.01)

(52) U.S. Cl. ............... 101/23; 101/28; 411/404
(58) Field of Classification Search .......... 101/8, 9, 101/21, 23, 25, 28; 162/368; 428/72; 72/196; 29/895.21, 465; 59/43; 83/873; 411/404; 492/30, 33, 34, 35, 36, 37, 28, 1
See application file for complete search history.

(56) References Cited

U.S. PATENT DOCUMENTS

| | | | |
|---|---|---|---|
| 1,988,787 A | 1/1935 | Fowler | |
| 3,323,983 A | 6/1967 | Palmer et al. | |
| 3,337,388 A | 8/1967 | Wosaba, II | |
| 3,547,723 A | 12/1970 | Gresham | |
| 3,640,175 A * | 2/1972 | Barclay | 411/403 |
| 3,855,046 A | 12/1974 | Hansen et al. | |
| 3,890,892 A | 6/1975 | Loose et al. | |
| 3,966,519 A | 6/1976 | Mitchell et al. | |
| 4,188,436 A | 2/1980 | Ellis et al. | |
| 4,189,266 A * | 2/1980 | Koslow | 408/224 |
| 4,311,540 A | 1/1982 | Hill | |
| 4,319,868 A | 3/1982 | Riemersma et al. | |
| 4,430,148 A | 2/1984 | Schaefer | |
| 4,614,632 A | 9/1986 | Kezuka et al. | |
| 4,659,608 A | 4/1987 | Schulz | |
| 4,671,983 A | 6/1987 | Burt | |
| 4,823,783 A | 4/1989 | Willhite, Jr. et al. | |
| 4,919,738 A | 4/1990 | Ball et al. | |
| 5,036,758 A * | 8/1991 | Kobayashi et al. | 101/28 |
| 5,158,523 A | 10/1992 | Houk et al. | |
| 5,335,842 A | 8/1994 | Mostafazadeh | |
| 5,366,786 A | 11/1994 | Connor et al. | |
| 5,458,950 A | 10/1995 | Bredenick et al. | |
| 5,468,323 A | 11/1995 | McNeil | |
| 5,733,411 A | 3/1998 | Bett | |

(Continued)

OTHER PUBLICATIONS

*PCT Search Report* for PCT/IB2007/05115 dated Aug. 8, 2007.

*Primary Examiner* — Ren Yan
*Assistant Examiner* — Allister Primo
(74) *Attorney, Agent, or Firm* — Dority & Manning, P.A.

(57) ABSTRACT

Facetted impression elements are disclosed. The impression elements can be located, for instance, on an anvil roll and may be used during an embossing or bonding process. The impression elements include at least two chamfered surfaces that at least partially surround the top surface. The chamfered surfaces are at an angle to the top surface that lower and reduce drag that may occur between the impression element and a sheet of material as the impression element enters and exits the sheet. In one embodiment, the impression element includes a first chamfered surface having an angle of from about 5° to about 40° and a second chamfered surface having an angle of from about 40° to about 70°.

37 Claims, 5 Drawing Sheets

U.S. PATENT DOCUMENTS

| | | | |
|---|---|---|---|
| 5,798,167 A | 8/1998 | Connor et al. | |
| 5,817,199 A | 10/1998 | Brennecke et al. | |
| 5,861,081 A | 1/1999 | Bredendick et al. | |
| 5,871,605 A | 2/1999 | Bett | |
| 5,954,625 A | 9/1999 | Giesler, Sr. | |
| 6,080,276 A * | 6/2000 | Burgess | 162/117 |
| 6,093,665 A | 7/2000 | Sayovitz et al. | |
| 6,106,929 A | 8/2000 | Bredenick et al. | |
| 6,173,496 B1 * | 1/2001 | Makoui et al. | 29/895.21 |
| 6,193,918 B1 | 2/2001 | McGuire et al. | |
| 6,302,998 B1 | 10/2001 | Burgess | |
| 6,395,133 B1 | 5/2002 | McNeil | |
| 6,440,564 B1 * | 8/2002 | McLain et al. | 428/409 |
| 6,537,644 B1 | 3/2003 | Kauschke et al. | |
| 6,602,454 B2 | 8/2003 | McGuire et al. | |
| 6,610,390 B1 | 8/2003 | Kauschke et al. | |
| 6,746,437 B2 | 6/2004 | Blenke et al. | |
| 6,766,937 B2 | 7/2004 | Stegelmann | |
| 6,767,420 B2 | 7/2004 | Stegelmann | |
| 6,773,647 B2 | 8/2004 | McGuire et al. | |
| 6,786,383 B2 | 9/2004 | Stegelmann | |
| 6,832,547 B2 | 12/2004 | Makoui et al. | |
| 6,841,921 B2 | 1/2005 | Stegelmann | |
| 6,869,006 B2 | 3/2005 | Franklin et al. | |
| 6,872,274 B2 | 3/2005 | Kauschke et al. | |
| 6,945,185 B2 | 9/2005 | Ribble et al. | |
| 6,957,608 B1 * | 10/2005 | Hubert et al. | 101/483 |
| 7,524,404 B2 * | 4/2009 | Boatman et al. | 162/362 |
| 2003/0008109 A1 * | 1/2003 | Basler et al. | 428/156 |
| 2003/0041953 A1 | 3/2003 | Farell et al. | |
| 2004/0011107 A1 | 1/2004 | Boegli | |
| 2004/0241399 A1 | 12/2004 | Marmon et al. | |
| 2005/0257910 A1 | 11/2005 | Boatman et al. | |
| 2006/0004334 A1 | 1/2006 | Schlinz et al. | |

* cited by examiner

EMBOSSING OR BONDING DEVICE CONTAINING FACETTED IMPRESSION ELEMENTS

BACKGROUND OF THE INVENTION

During the manufacture of many consumable products, sheet materials are subjected to an embossing process or to a bonding process in which the sheet materials are pressed against a rotating roll having a plurality of raised elements. The raised elements form densified areas in the sheet material which can be, for instance, embossments or bonding areas.

The sheet materials are subjected to a process as described above for various different reasons. For instance, in some embodiments, the sheet materials are embossed solely to improve the aesthetic appeal of the product. For instance, many tissue products, such as paper towels and bath tissues, are embossed with decorative designs.

In other embodiments, the sheet materials may comprise a plurality of layers and the densified areas are used to bond the different layers together. For instance, the different layers contained within the sheet material may be made from thermoplastic polymers that soften and form the bond areas when contacting the raised elements on the rotating roll. The layers contained within the sheet materials, for instance, may comprise nonwoven webs made from thermoplastic fibers and/or may comprise polymer films. In order to form the bond areas, typically some type of energy is needed to cause the thermoplastic materials to soften. For example, ultrasonic horns are sometimes used in combination with the rotating roller containing the raised elements in order to subject the sheet material to ultrasonic energy.

In an alternative embodiment, thermal energy is used in order to form the bond areas. In this embodiment, for example, the roller containing the raised elements may be heated using an electrical resistance heater or by circulating a hot fluid, such as an oil, through the roller.

In these types of processes, a reoccurring problem is that the raised elements on the rotating roller may have sharp edges that cause tearing, fracturing, fatiguing, or general weakening of the sheet material as the material is fed through the process. For example, the sharp edges may have a tendency to damage the sheet material as the sheet material contacts the leading edge of the raised element and as the sheet material contacts the trailing edge of the raised element. In some instances, for instance, edges on the raised element have been known to even form holes in the sheet material being processed.

In the past, various attempts have been made in order to minimize the effects of any edges present on the raised elements. For instance, the raised elements on the bonding roller have been mechanically worked in order to reduce sharp edges and to lessen the damage that may be caused by the raised elements. Such attempts, however, have not fully eradicated the problem and/or have added great cost in producing the equipment used to run the process. As such, further improvements are still desired.

SUMMARY OF THE INVENTION

In general, the present disclosure is directed to an embossing or bonding process in which a sheet material is contacted with a raised element that is configured to form impressions, such as densified areas, in the sheet material without substantially damaging the material. For instance, the raised element has a facetted design that minimizes occurrences of tearing, fracturing, or fatiguing of the material as the material is fed through the process.

For example, in one embodiment, the present disclosure is directed to an embossing or bonding roller for sheet materials comprising an anvil roller defining a surface. At least one facetted impression element extends from the surface of the anvil roller. For example, in one embodiment, a plurality of facetted impression elements may be positioned on the surface of the anvil roller according to any suitable pattern. The facetted impression element is for bonding or embossing a sheet material that is contacted with the anvil roller. In accordance with one embodiment of the present disclosure, the impression elements include a first chamfered surface adjacent to a top surface and a second chamfered surface positioned below the first chamfered surface.

For example, in one embodiment, a compound angle is formed around the top surface of the impression element which has been found to significantly reduce fracturing of the sheet material as the sheet material is contacted with the rotating anvil roller. In particular, the chamfered surfaces form release angles on the impression element as a sheet material is transferring in and out of contact with the raised element. In other words, the chamfered surfaces have been found to lessen a drag effect between the edges of the impression element and the sheet material during contact.

The first chamfered surface on the impression element forms a first angle with respect to a horizontal plane and the second chamfered surface forms a second angle relative to a horizontal plane. In one embodiment, the first angle is less than the second angle. For example, the first angle can be from about 5° to about 45°, such as from about 10° to about 25°. The second angle, on the other hand, can be from about 40° to about 75°, such as from about 40° to about 60°. In one particular embodiment, for instance, the first angle can be about 15°, while the second angle can be about 45°.

The length of the first chamfered surface and the length of the second chamfered surface can also vary depending upon the particular application. In one embodiment, for instance, the first chamfered surface length can be from about 0.004" to about 0.125", while the second chamfered surface can from about 0.125" to about 0.250". It should be understood, however, that the length of the chamfered surfaces can be less or greater than the ranges provided above.

In an alternative embodiment of the present disclosure, the one or more impression elements only includes a single chamfered surface. Incorporating only a single chamfered surface into the impression element, for instance, may be particularly applicable when forming short bond points or embossments. For instance, in this embodiment, the impression element may have a height of less than about 20 thousands of an inch, such as from about 6 thousands to about 10 thousands of an inch.

In general, the facetted impression element can be made from any suitable hard material, such as a metal. In one embodiment, for instance, the impression element can be made from steel. Further, when viewing the impression element from the top surface, the impression element can have any suitable shape. For instance, the impression element can be circular, rectangular, triangular, or any other shape.

Further, impression elements may also be plated or coated with various materials. For instance, impression elements can be plated with a metal such as chrome and/or nickel. The impression elements can also be plasma coated or can be coated with flouropolymer such as a TEFLON coating.

The size of the impression element can be relatively small or relatively large depending upon whether the impression element is being used to bond or emboss a sheet material. In one embodiment, for instance, the top surface of the impression element may have a surface area of less than about 3 mm$^2$, such as less than about 1 mm$^2$.

The first chamfered surface and the second chamfered surface are generally located in the top half of the height of the impression element. For instance, the first and second chamfered surfaces can be located in the top 40% of the height of the impression element, such as in the top 33%, such as in the top 25%, such as in the top 20% of the height of the impression element. The chamfered surfaces can also be located immediately adjacent to one another. For instance, the first chamfered surface can include a first edge that is adjacent to the top surface of the impression element and a second and opposite edge that is adjacent to the second chamfered surface. The impression element can be substantially vertical below the second chamfered surface or can also include an inclusive angular surface. The inclusive angular surface positioned below the second chamfered surface can generally have an angle of from about 30° to about 60° to a horizontal plane.

As described above, the facetted impression elements of the present disclosure can be used in various different processes. The impression elements, for instance, can be used to emboss sheet materials or to form bond areas in sheet materials. For instance, in one embodiment, the sheet material may comprise a plurality of layers made from thermoplastic polymers that are bonded together when contacted with the impression elements.

In this regard, the present disclosure is also directed to a device for forming embossments or bond areas in sheet materials incorporating the embossing or bonding roller as described above. For example, in one embodiment, a rotary ultrasonic horn may be positioned adjacent to the embossing or bonding roller in order to form bond areas in a sheet material. Alternatively, the embossing or bonding roller can be placed adjacent to a second roller for forming a nip that receives the sheet material. One or both of the rollers may be heated in order to form thermal bonds in the sheet material.

The present disclosure is also directed to a method of forming embossments or bonding areas in a sheet material. The method includes the steps of contacting a sheet material with an anvil roller having a plurality of facetted impression elements as described above under sufficient pressure or energy to cause the impression elements to form depressions, such as densified areas, in the sheet material. In one embodiment, the method can operate at relatively high speeds. For instance, the sheet material can be contacted with the anvil roller having the plurality of facetted impression elements at a speed of at least about 600 ft/min, such as at a speed of at least 1000 ft/min.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
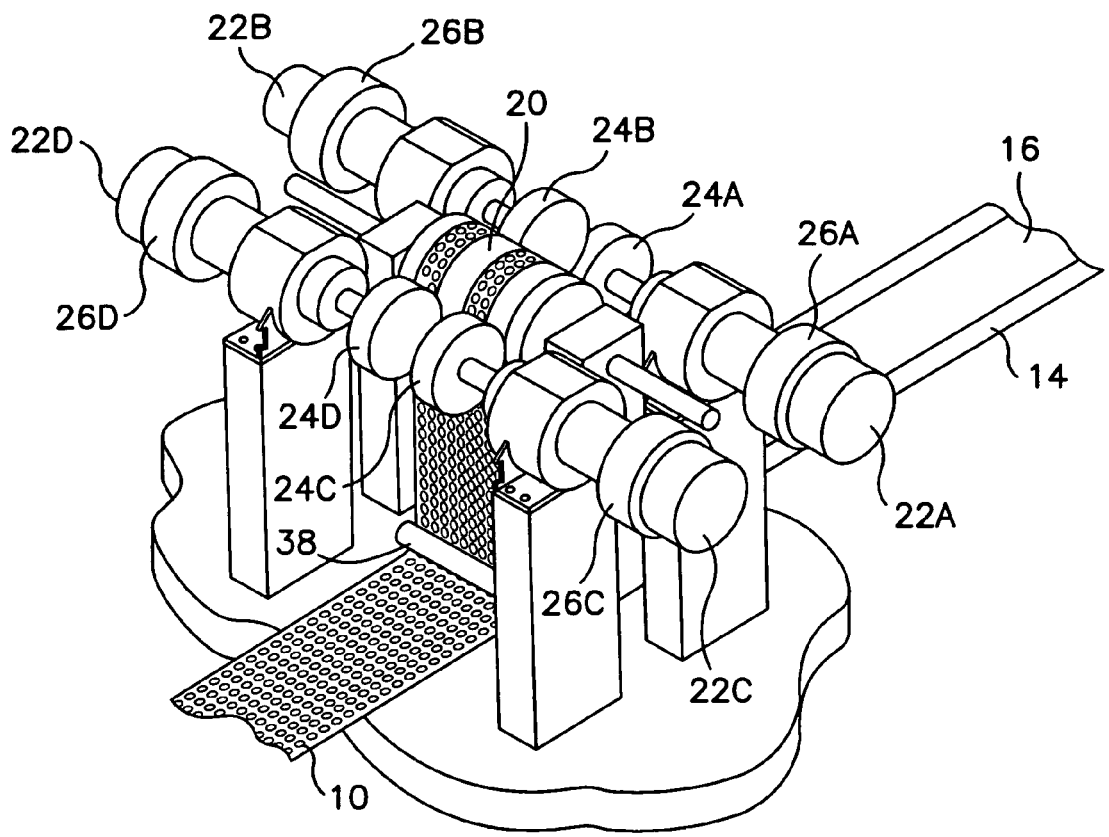
FIG. 1 is a perspective view of one embodiment of an ultrasonic bonding process incorporating facetted impression elements made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to apparatus and processes for forming embossments and/or bonding areas into sheet materials. The sheet materials are contacted with an anvil roll containing at least one facetted impression element made in accordance with the present disclosure. For example, in one embodiment, a plurality of facetted impression elements form raised projections on the anvil roll according to a particular pattern. The sheet materials may be contacted with the anvil roll as the anvil roll is rotating in order to form the densified areas.

In accordance with the present disclosure, the facetted impression elements include a top surface that is surrounded by at least one, such as at least two different chamfered surfaces. The chamfered surfaces are formed into the impression elements so that, during processing, a sheet material is not damaged by an edge of the impression element.

For example, as described above, previous raised elements on anvil rolls had a tendency to damage sheet materials as the raised element rotated into and out of engagement with the sheet material. Specifically, the edges on the raised elements, under some circumstances, have been known to tear, fracture or generally weaken the sheet material where contact was made. The facetted impression elements of the present disclosure, however, significantly reduce fracturing of any of the substrates that are processed. In particular, the chamfered surfaces on the impression elements provide a release angle between the impression elements and a sheet material being processed as the elements are rotated into and out of engagement with the sheet material. It is believed, for instance, that the chamfered surfaces lessen the drag effect that occurs when the impression elements contact a substrate.

Of particular advantage, the chamfered surfaces can be formed into the impression elements by a machining process that is much less expensive than attempting to round the edges of the impression elements and can also provide for much greater accuracy. The impression elements can also be coated with a release coating or plated with a wear resistant plating such as chrome that is more wear resistant when applied to a facetted impression element in accordance with the present disclosure.

A facetted impression element of the present disclosure may be used in numerous different applications. The impression elements, for instance, may be used to form impressions or densified areas into any suitable sheet materials. For instance, the impression elements may be used to emboss tissue products, such as bath tissue, facial tissue, paper towels, napkins, and the like.

In other embodiments, the facetted impression elements may be used to emboss or form point bonds in sheet materials made from thermoplastic polymers. For example, the facetted impression elements may be used during ultrasonic bonding or during thermal bonding of two or more thermoplastic sheets. The sheets may comprise, for instance, nonwoven webs containing fibers made from thermoplastic materials and/or films made from thermoplastic materials. The thermoplastic materials may be elastic or non-elastic. Such materials are typically bonded together during the production of various consumer products, such as personal care products. Personal care products include, for instance, diapers, training pants, feminine hygiene products, adult incontinence products, and the like. Thermoplastic materials are also typically bonded together to produce various medical garments, such as surgical drapes, surgical gowns, lab coats, wound dressings, and the like.

In one particular embodiment, for instance, the facetted impression elements of the present disclosure may be used to enclose an absorbent structure between two layers made from thermoplastic polymers. For instance, the layers may comprise nonwoven webs and/or films. The layers can be bonded together with the absorbent structure positioned therebetween.

In still another embodiment, the bonding process of the present disclosure may be used to bond an elasticized cuff onto a garment, such as a medical gown. In one embodiment, for instance, an elastic woven material is first covered with a molten polymer, such as a polypropylene. The elastic woven material coated with the polymer may then be bonded to a garment so as to form a cuff on the garment. For instance, the elastic material may be bonded to the end of a sleeve on a medical garment made from a thermoplastic laminate, such as a spunbond/meltblown/spunbond laminate.

Figure 2:
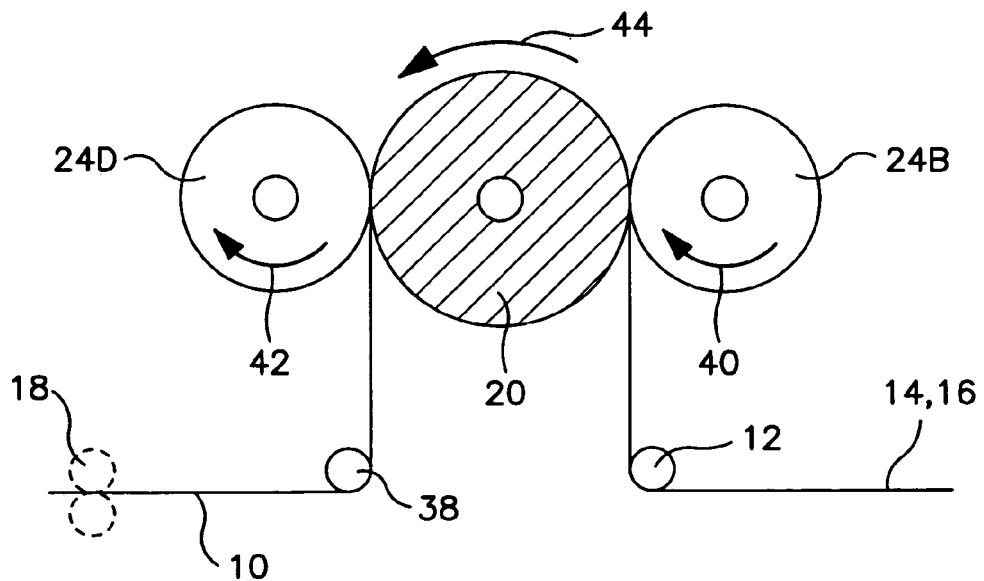
FIG. 2 is a cross sectional view of the process illustrated in FIG. 1.

Referring to FIGS. 1 and 2, one embodiment of a process incorporating the facetted impression elements of the present disclosure is illustrated. In particular, the process shown in FIGS. 1 and 2 is an ultrasonic bonding process for bonding multiple layers together in fabricating a composite sheet material. It should be understood that the process illustrated in FIGS. 1 and 2 is for exemplary purposes only and is not intended to limit the invention.

As shown, a turning roll 12 turns a first web 14 and a second web 16 towards an anvil roll 20. The first web 14 and the second web 16 are in surface-to-surface relationship with each other, both at the turning roll 12 and at the anvil roll 20. The first and second webs 14, 16 are drawn about the turning roll 12 and the anvil roll 20 by a pair of nip rolls 18.

In this embodiment, a plurality of ultrasonic energy application devices 22A, 22B, 22C and 22D are positioned about the surface of the anvil roll 20. The ultrasonic energy application devices include rotary ultrasonic horns 24A, 24B, 24C and 24D and ultrasonic conduit units 26A, 26B, 26C and 26D. As shown, the ultrasonic energy application devices are mounted to supports that place the rotary ultrasonic horns adjacent to the anvil roll 20.

In the embodiment illustrated in FIG. 1, four different ultrasonic energy application devices are placed in association with the anvil 20. It should be understood, however, that the apparatus may include more or less of the ultrasonic energy application devices. For example, in many applications, only a single ultrasonic energy application device is needed.

In the embodiment illustrated in FIG. 1, the first and second ultrasonic energy application devices 22A and 22B in combination with the anvil roll 20 apply ultrasonic energy to the first and second webs 14 and 16 on one side of the anvil roll. The ultrasonic energy applied forms bond areas or point bonds on different segments of the composite material.

During the process, the anvil roll 20 rotates at a surface speed corresponding with the speed of advance of the webs, namely the speed at which the webs 14 and 16 are drawn by a pair of nip rolls 18 as shown in FIG. 2. The webs 14 and 16 maintain a constant and static registration with the outer surface of the anvil roll 20 as the webs advance about the circumference of the rotating roll. Thus, the webs 14 and 16 advance together with the outer circumference surface of the anvil roll 20. As the webs advance from the first and second bonding locations, the anvil roll 20 carries the webs towards the third and fourth ultrasonic energy application devices 22C and 22D. The third and fourth ultrasonic energy application devices 22C and 22D apply ultrasonic energy to the webs and ultrasonically bond the webs together in the remaining segments. In this manner, the webs are point bonded across substantially all of the width of the composite material.

Once the first and second webs 14 and 16 are bonded together, the webs form a composite sheet material 10 that then advances about a second turning roll 38 and downstream for further processing or use as a finished product. For example, in one embodiment, the bonded composite sheet material 10 may be a completed items or the material may receive continued processing.

The cross sectional view of FIG. 2 shows the orientation of the ultrasonic horns 24B and 24D with respect to the circumference of the anvil roll 20. For clarity of illustration, certain elements have been removed from the drawing. The arrows 40, 42 and 44 indicate the directions of rotation of the anvil roll 20 and the rotary ultrasonic horns 24B and 24D as the material is fed through the process in a right to left manner.

The webs 14 and 16 can comprise any of a wide variety of web materials, such as polyolefin films, porous foams, reticulated foams, apertured plastic films, or one or more layers made with natural fibers. For instance, the webs may comprise a thin plastic film or other flexible liquid-impermeable material. When a plastic film, for example, the film may be made from polypropylene or polyethylene having a thickness of less than about 0.02 millimeters.

In order to provide a composite material having a cloth-like feeling, one or more of the webs may also comprise a nonwoven web, such as a spunbond web or a meltblown web comprised of polyolefin fibers. The polyolefin fibers may comprise, for instance, polyethylene fibers or polypropylene fibers. Such nonwoven webs can have a variety of basis weights, such as from about 15 gsm to about 150 gsm, such as from about 20 gsm to about 30 gsm.

Other nonwoven webs that may be used in the process include carded webs and/or bonded webs comprised of natural and/or synthetic fibers. Further, woven materials may also be incorporated into the sheet material 10.

The webs 14 and 16 can also be elastic or non-elastic. In order to produce elastic webs, the webs can be made from various elastomers as is known in the art.

In the embodiment illustrated in FIG. 1, the web 16 is shown having a width less than the web 14. It should be understood, however, that the webs can have the same width if desired. Further, it should also be understood that the composite sheet material 10 can be formed from more than two webs. For example, in other embodiments, the composite material can be formed from three webs, from four webs, from five webs, and the like.

The ultrasonic energy application devices 22A through 22D can comprise any suitable ultrasonic bonding apparatus. In the embodiment illustrated, the ultrasonic energy application devices include rotary ultrasonic horns and ultrasonic conduit units that apply ultrasonic energy to the webs. If desired, each ultrasonic energy application device can also apply mechanical pressure to the webs during the bonding process. For instance, the ultrasonic energy application devices can apply up to about 50 pounds per linear inch of pressure across the width of the material. The width of each rotary ultrasonic horn 24 can vary depending upon the particular application and the desired result. For instance, in one embodiment, the rotary ultrasonic horn can have a width of from about 1 inch to about 4 inches. In one embodiment, each ultrasonic horn can apply about 800 watts of energy.

The mechanical pressure applied to the webs, the speed of the webs, the power supplied by the ultrasonic horns and the material being worked have an effect on the final product that is made. For example, increasing the speed of travel of the webs may require increasing the mechanical pressure and/or increased ultrasonic energy to perform bonding in a shorter time period. The speed of the web, for instance, in some applications may be greater than about 600 ft/min, such as greater than about 1000 ft/min.

In order to form bond areas on the composite material 10, the anvil includes a pattern of raised elements that cooperate with the ultrasonic energy application devices. In accordance with the present disclosure, the raised elements comprise facetted impression elements. For instance, referring to FIG. 3, a representative portion of the surface of the anvil roll 20 is shown including a plurality of the facetted impression elements 50. In the embodiment illustrated in FIG. 3, the pattern of the impression elements is uniform in columns and rows. It should be understood, that the impression elements may appear in any suitable pattern. For instance, the pattern of the elements may form a particular design. Also, in addition to regular patterns as shown in FIG. 3, irregular patterns may also be used.

Figure 3:
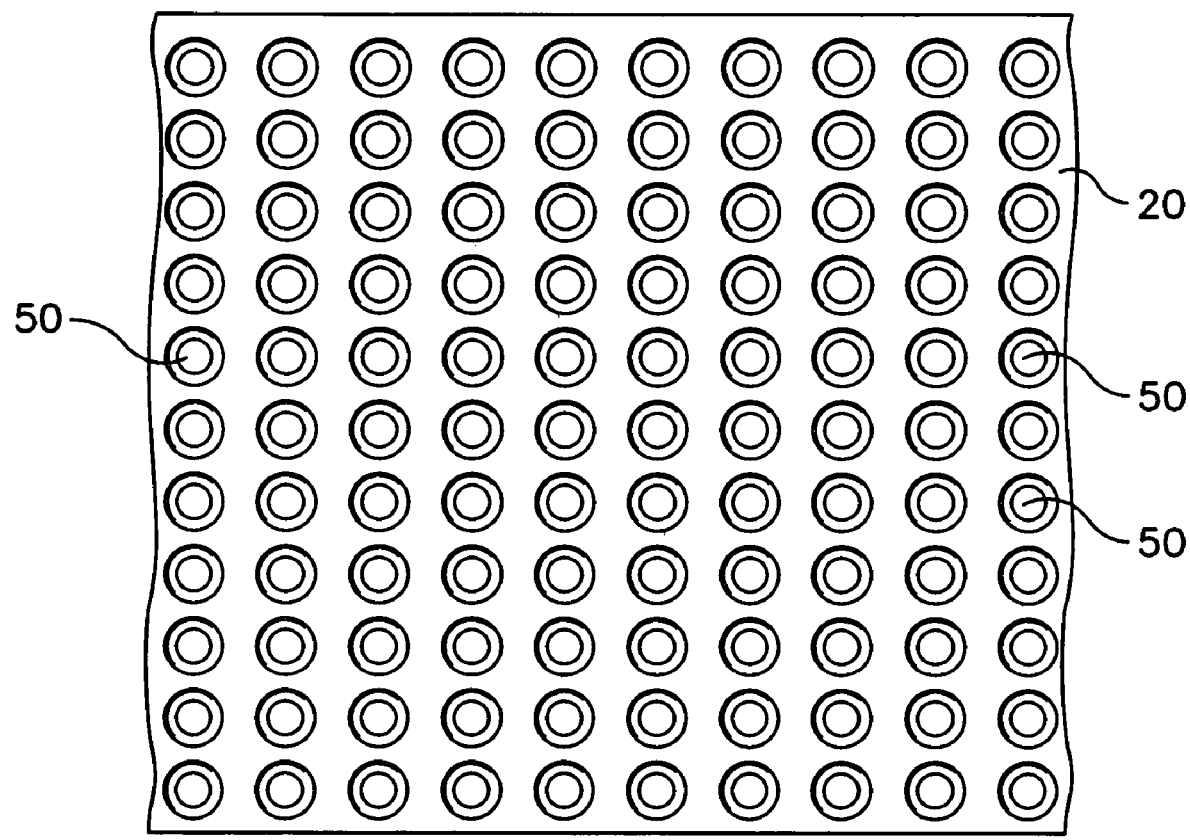
FIG. 3 is an enlarged planar representation of a portion of the outer surface of an anvil roll as shown in FIG. 1 illustrating a plurality of the facetted impression elements.

As the webs are fed into a nip formed between the anvil roll 20 and the rotary ultrasonic horns, bond areas are formed into the resulting composite sheet material as shown in FIG. 1 according to where the impression elements 50 are located on the anvil roll as shown in FIG. 3.

Referring to FIGS. 5 through 8, various embodiments of facetted impression elements made in accordance with the present disclosure are illustrated. For instance, in FIG. 5 a generally rectangular impression element 50 is illustrated, while in FIG. 7 a generally circular impression element is shown. It should be understood, however, that the impression elements can have any suitable shape as may be desired. The impression elements, for instance, may have the shape of a triangle, may have the shape of an oval, or may have a more complex shape.

Figure 5:
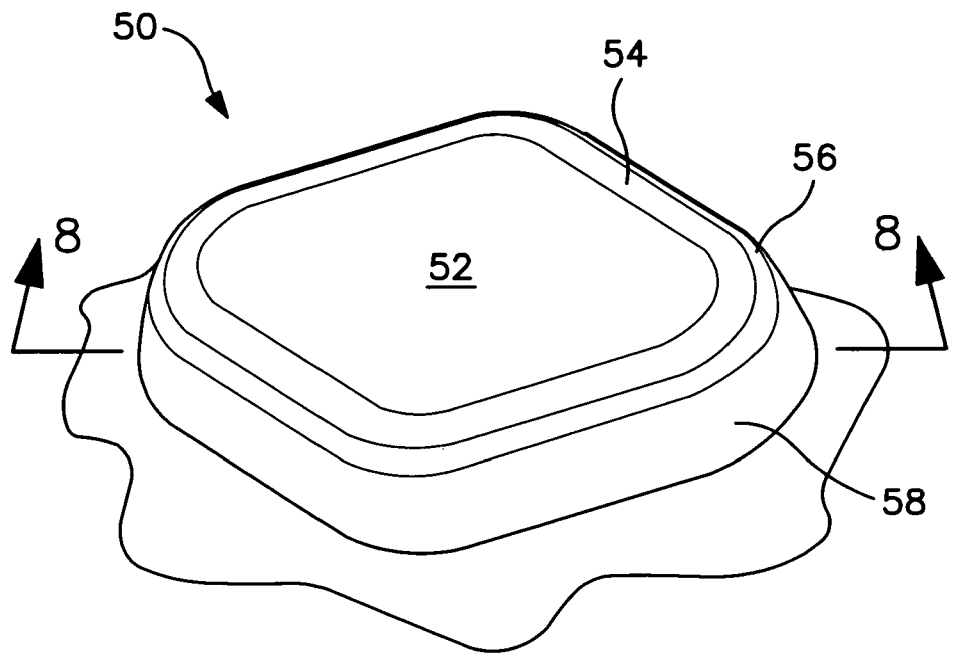
FIG. 5 is an enlarged perspective view of one embodiment of a facetted impression element in accordance with the present disclosure.
Figure 6:
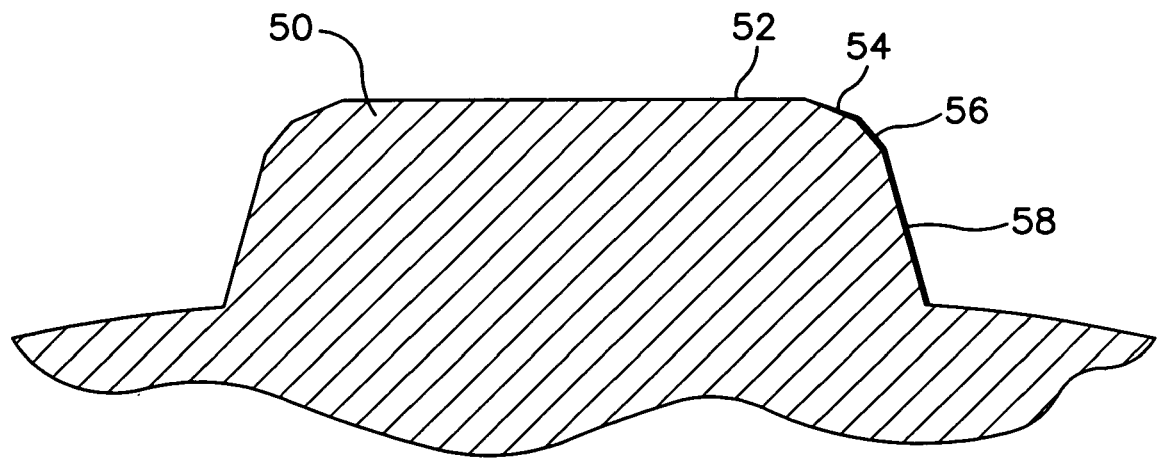
FIG. 6 is a cross sectional view of the facetted impression element shown in FIG. 5.

Referring to the embodiments shown in FIGS. 5 and 6, a generally rectangular shaped facetted impression element 50 includes a top surface 52 that is surrounded by a first chamfered surface 54 and a second chamfered surface 56. In the embodiment illustrated in FIG. 5, the chamfered surfaces 54 and 56 completely surround the top surface 52. In other embodiments, however, it may only be necessary to include chamfered surfaces on the leading edge and trailing edge of the impression element 50.

The chamfered surfaces 54 and 56 are angled with respect to a horizontal plane that intersects a vertical axis of the impression element 50. The chamfered or angled surfaces are located and have a length so that when rotated on an anvil roll and contacted with a sheet material, the impression element does not present a sharp edge or corner that contacts the sheet material. The two chamfered surfaces 54 and 56 reduce the amount of drag that develops between the impression element 50 and the sheet material as the impression element 50 enters and exits the sheet material. In FIG. 5, only two chamfered surfaces 54 and 56 are shown. It should be understood, however, that in other embodiments more or less chamfered surfaces may be present.

For example, in one embodiment, the impression element may only include a single chamfered surface. Including only a single chamfered surface on the impression element may be appropriate, for instance, when forming relatively short bond points or embossments. For instance, in this embodiment, the impression element may have a height less than about 20 thousands of an inch, such as from about 6 thousands of an inch to about 10 thousands of an inch.

In general, the angle of the first chamfered surface 54 is less than the angle of the second chamfered surface 56. The angle of the first chamfered surface 54, for instance, may be from about 5° to about 45°, such as from about 10° to about 25° with respect to the horizontal. The second chamfered surface, on the other hand, may have an angle of from about 40° to about 75°, such as from about 25° to about 60°. For instance, in one particular embodiment, the angle of the first chamfered surface 54 may be about 15° while the angle of the second chamfered surface 56 may be about 45°.

The length of the chamfered surfaces may also vary depending upon the particular application. In general, the linear length of the first chamfered surface may be the same, may be less than, or may be greater than the length of the second chamfered surface. In general, the length of the chamfered surfaces may be from about 0.004" to about 0.250".

As shown in FIG. 5, a first edge of the first chamfered surface 54 is directly adjacent to the top surface 52, while the second edge of the chamfered surface 54 is directly adjacent to the second chamfered surface 56. The chamfered surfaces, however, may be spaced apart from each other in different applications.

As shown in FIG. 6, the chamfered surfaces 54 and 56 are generally located at the top of the impression element 50. For instance, the chamfered surfaces 54 and 56 generally lie in the top half of the height of the impression element 50. In various embodiments, for instance, the chamfered surfaces 54 and 56 may be located in the top 40%, top 33%, top 30%, top 25%, top 20%, top 15%, or even in the top 10% of the height of the facetted impression element.

After the second chamfered surface 56, the remainder of the walls of the impression element may be vertical or may be angular. For example, as shown in the figures, the facetted impression element 50 includes an inclusive angular surface 58. In general, the angular surface 58 can have an angle with respect to the horizontal of from about 90° to about 30°, such as from about 60° to about 30°.

The size of the facetted impression element 50 as shown in FIG. 5 can vary depending upon the particular application. In general, the impression elements may have a vertical height of from about 0.005" to about 0.070". The surface area of the top surface 52 can be, in one embodiment, less than about 1 mm$^2$, such as less than about 0.75 mm$^2$. The impression element 50 is generally made from a hard material. When used in a bonding process as shown in FIG. 1, for instance, the impression element can be made from a metal, such as steel.

The chamfered surfaces 54 and 56 can be formed into the impression element 50 using any suitable process. For instance, in one embodiment, the impression element can be machined in order to form the angular surfaces. Of particular advantage, machining the chamfered surfaces into the impression element allows for relatively great accuracy in forming the impression element with the desired amount of surface area on the top surface. Further, in one embodiment, the chamfered surfaces may be machined a second time in order to recondition the impression element or to change the surface area of the top surface.

Once formed, if desired, the impression element may be coated with a release coating if desired. The release coating may comprise, for instance, a plasma coating or a metal coating such as a chrome and/or nickel electro plating. In an alternative embodiment, the release coating may comprise a flourocarbon polymer, such as a TEFLON coating. Of particular advantage, it has also been discovered that the chamfered surfaces reduce wear of the release coating over time.

Figure 7:
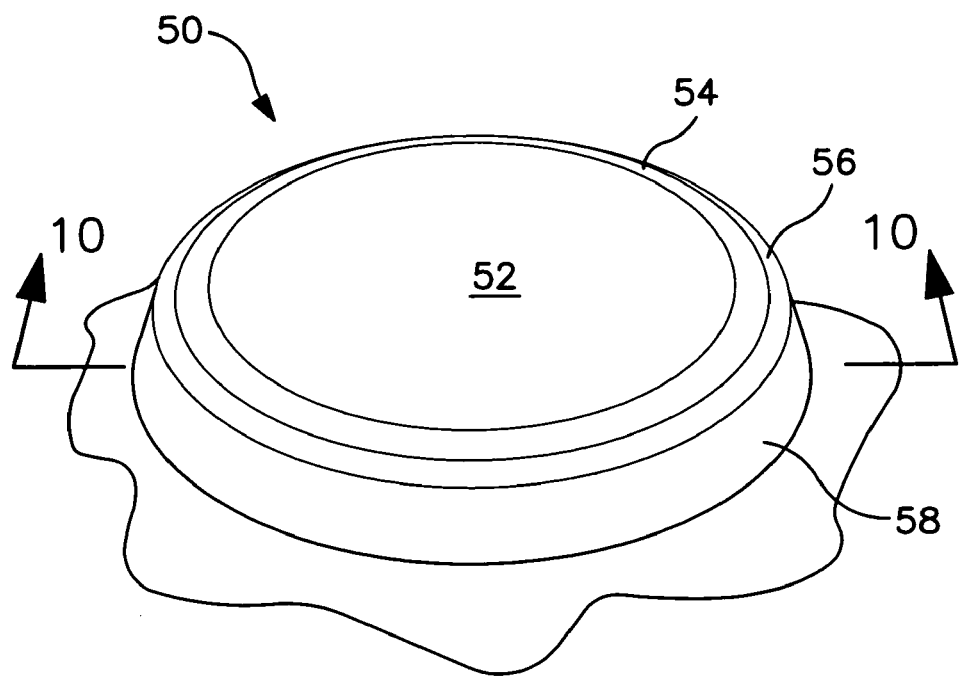
FIG. 7 is an enlarged perspective view of another embodiment of a facetted impression element made in accordance with the present disclosure.
Figure 8:
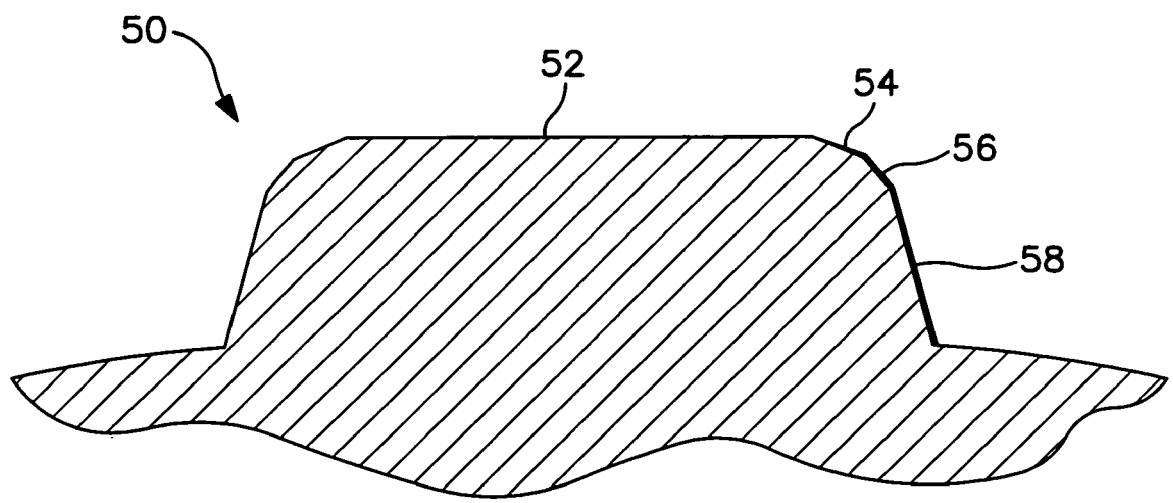
FIG. 8 is a cross sectional view of the facetted impression element as shown in FIG. 7.

Referring to FIGS. 7 and 8, a circular impression element 50 is shown. Like reference numerals have been used to indicate similar elements. For instance, as shown the impression element 50 includes a top surface 52 surrounded by a first chamfered surface 54 and a second chamfered surface 56. An angled inclusive surface 58 is located below the second chamfered surface 56.

Figure 4:
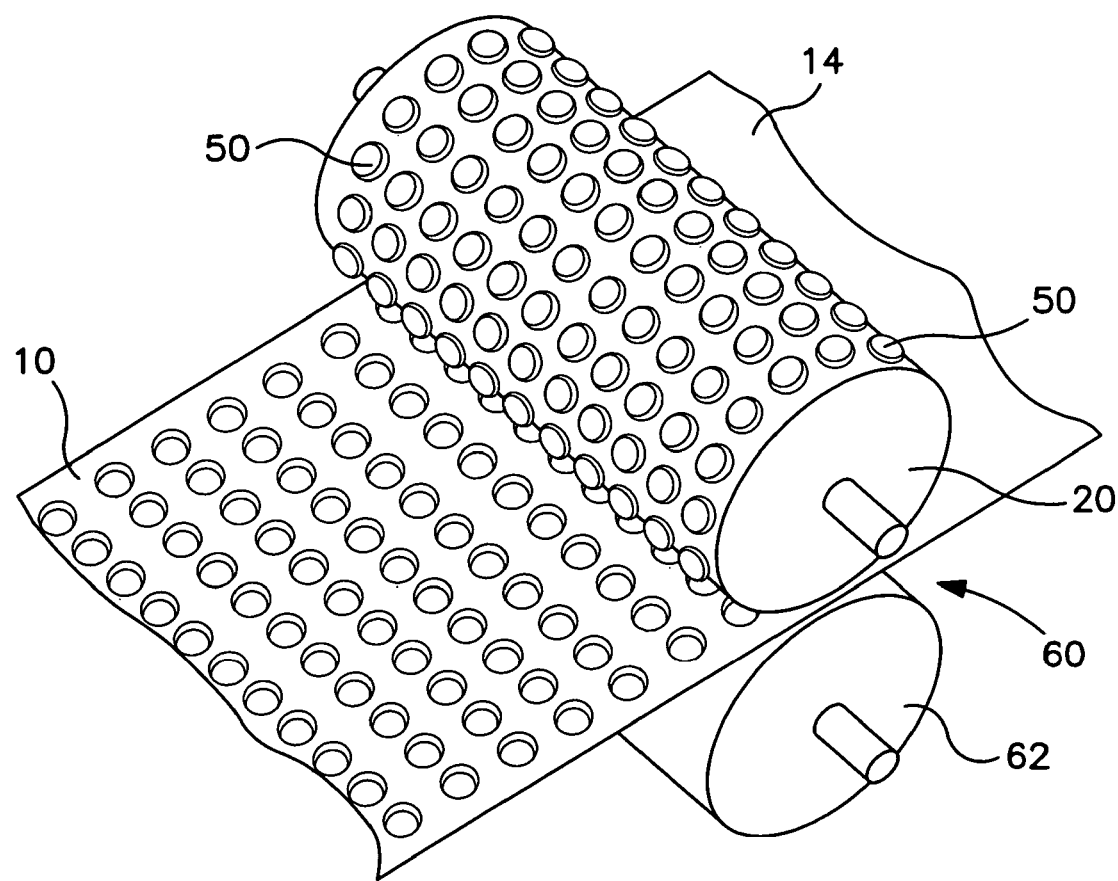
FIG. 4 is a perspective view of another embodiment of an embossing or bonding process in accordance with the present disclosure.

In the embodiment illustrated in FIG. 1, the facetted impression elements 50 are shown used in an ultrasonic bonding process. It should be understood, however, that the impression elements can be used in any other suitable bonding or embossing processes. For instance, an alternative embodiment of a process in accordance with the present disclosure is shown in FIG. 4. Like reference numerals have been used to indicate similar elements. As shown in FIG. 4, in this embodiment, at least one layer of a material 14 is fed into a nip 60 formed between an anvil roll 20 containing a plurality of impression elements 50 and a backing roll 62. As the anvil roll 20 and the backing roll 62 rotate, the web 14 is fed into the nip in order to form an embossed or bonded material 10.

The impression elements 50 on the anvil roll 20 may comprise either of the impression elements illustrated in FIGS. 5 and 7 or other suitable impression elements containing at least two chamfered surfaces as described above.

In the process illustrated in FIG. 4, pressure is exerted on the web 14 as it is fed into the nip 60. The process may be used in order to form embossments into any suitable material. For example, the sheet of material 14 may comprise a tissue web, a film, a nonwoven web, or a woven material. The sheet of material 14 may also comprise a single layer or may comprise multiple layers.

In an alternative embodiment, heat may be applied to at least one of the anvil roll 20 and/or the backing roll 62 in order to thermally emboss and/or bond the material 14. For instance, in one embodiment, the anvil roll 20 may be heated by any suitable heating device. The anvil roll 20 may be heated, for instance, using an electrical resistance heater or by circulating a hot fluid, such as oil, through the anvil roll.

In one embodiment, for instance, multiple webs made from thermoplastic polymers may be fed in between the anvil roll 20 and the backing roll 62 in order to bond the materials together by forming bond areas where the materials contact the impression elements 50.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An embossing or bonding roller for sheet materials comprising:
   an anvil roller defining a surface; and
   at least one facetted impression element extending from the surface of the anvil roller, the facetted impression element for bonding or embossing a sheet material that is contacted with the anvil roller, the impression element having a top surface and a height, the facetted impression element including a first chamfered surface adjacent to the top surface, a second chamfered surface positioned below the first chamfered surface, and a third surface positioned below the second chamfered surface and connecting the second chamfered surface with the surface of the anvil roller, the first chamfered surface having a first length and wherein a cross-section of the first chamfered surface is linear over the entire length of the first chamfered surface, the second chamfered surface having a second length and wherein a cross-section of the second chamfered surface is also linear over the length of the second chamfered surface, wherein the first chamfered surface has a first edge and a second edge, the first edge being adjacent to the top surface while the second edge being adjacent to the second chamfered surface.

2. An embossing or bonding roller as defined in claim 1, wherein the first chamfered surface is at a first angle to a horizontal plane and the second chamfered surface is at a second angle to a horizontal plane and wherein the first angle is less than the second angle.

3. An embossing or bonding roller as defined in claim 2, wherein the first angle is from about 5° to about 45° and the second angle is from about 40° to about 75°.

4. An embossing or bonding roller as defined in claim 2, wherein the first angle is from about 10° to about 25° and the second angle is from about 40° to about 60°.

5. An embossing or bonding roller as defined in claim 1, wherein the facetted impression element has a circular shape or a rectangular shape.

6. An embossing or bonding roller as defined in claim 1, wherein the anvil roller includes a plurality of facetted impression elements that cover the surface of the anvil roller.

7. An embossing or bonding roller as defined in claim 1, wherein the top surface of the facetted impression element has a surface area of less than about 3 mm$^2$.

8. An embossing or bonding roller as defined in claim 1, wherein the top surface of the facetted impression element has a surface area of less than about 1 mm$^2$.

9. An embossing or bonding roller as defined in claim 1, wherein the facetted impression element further comprises an inclusive angular surface below the second chamfered surface.

10. An embossing or bonding roller as defined in claim 9, wherein the inclusive angular surface has an angle of from about 30° to about 60° relative to a horizontal plane.

11. An embossing or bonding roller as defined in claim 1, wherein the first length is less than the second length.

12. An embossing or bonding roller as defined in claim 11, wherein the first length is from about 0.004" to about 0.125" and the second length is from about 0.125" to about 0.250".

13. An embossing or bonding roller as defined in claim 1, wherein the first chamfered surface and the second chamfered surface are located in the top half of the height of the facetted impression element.

14. An embossing or bonding roller as defined in claim 1, wherein the first chamfered surface and the second chamfered surface are located in the top third of the height of the facetted impression element.

15. An embossing or bonding roller as defined in claim 1, wherein the at least one facetted impression element is made from a metal.

16. A device for forming embossments or bond areas in sheet materials comprising the embossing or bonding roller of claim 1.

17. A device for forming embossments or bond areas as defined in claim 16, wherein the device further comprises a rotary ultrasonic horn positioned adjacent to the embossing or bonding roller for forming ultrasonic bond areas in a sheet material.

18. A device for forming embossments or bond areas as defined in claim 16, further comprising a second roller that forms a nip with the embossing or bonding roller, the nip for receiving a sheet material.

19. A device for forming embossments or bond areas as defined in claim 18, further comprising a heating device for heating the embossing or bonding roller for forming thermal bond areas in a sheet material.

20. A method of forming embossments or bonding areas in a sheet material comprising:
contacting a sheet material with an anvil roller having a plurality of facetted impression elements extending therefrom, the sheet material being contacted with the anvil roller under sufficient pressure or energy to cause the impression elements to form depressions in the sheet material, the facetted impression elements having a top surface and a height, the facetted impression elements including a first chamfered surface adjacent to the top surface, a second chamfered surface positioned below the first chamfered surface, and a third surface positioned below the second chamfered surface and connecting the second chamfered surface with the surface of the anvil roller, the first chamfered surface having a first length and wherein a cross-section of the first chamfered surface is linear over the entire length of the first chamfered surface, the second chamfered surface having a second length and wherein a cross-section of the second chamfered surface is also linear over the length of the second chamfered surface, wherein the first chamfered surface has a first edge and a second edge, the first edge being adjacent to the top surface while the second edge being adjacent to the second chamfered surface.

21. A method as defined in claim 20, wherein the sheet material comprises a plurality of layers and wherein the depressions formed in the sheet material comprise bond areas for bonding the layers together.

22. A method as defined in claim 21, wherein the sheet material is contacted with the anvil roller in the presence of ultrasonic energy in an amount sufficient to form the bond areas.

23. A method as defined in claim 21, wherein the sheet material is contacted with the anvil roller in the presence of heat in an amount sufficient to form the bond areas.

24. A method as defined in claim 21, wherein an absorbent structure is positioned in between the plurality of layers for encasing the absorbent structure between the layers after bonding.

25. A method as defined in claim 20, wherein the sheet material contains a thermoplastic polymer and is bonded to an elastic material.

26. A method as defined in claim 25, wherein the elastic material comprises a woven material.

27. A method as defined in claim 25, wherein the elastic material is first coated with a thermoplastic polymer prior to being bonded to the sheet material.

28. A method as defined in claim 27, wherein the elastic material forms a cuff on the garment.

29. A method as defined in claim 20, wherein the sheet material comprises an elastic material.

30. A method as defined in claim 21, wherein the sheet material comprises at least two nonwoven webs.

31. A method as defined in claim 21, wherein the sheet material comprises a nonwoven web and a film layer.

32. A method as defined in claim 20, wherein the first angle is from about 5° to about 45° and the second angle is from about 40° to about 75°.

33. A method as defined in claim 20, wherein the top surface of the facetted impression element has a surface area of less than about 1 mm$^2$.

34. A method as defined in claim 20, wherein the facetted impression element further comprises an inclusive angular surface below the second chamfered surface.

35. A method as defined in claim 20, wherein the first chamfered surface and the second chamfered surface are located in the top third of the height of the facetted impression element.

36. A method as defined in claim 20, wherein the sheet material contacts the anvil roller at a speed of at least about 600 feet per minute.

37. An embossing or bonding roller for sheet materials comprising:
an anvil roller defining a surface; and
at least one facetted impression element extending from the surface of the anvil roller, the facetted impression element for bonding or embossing a sheet material that is contacted with the anvil roller, the impression element having a top surface and a height, the facetted impression element including a first chamfered surface adjacent to the top surface, a second chamfered surface positioned below the first chamfered surface, and a third surface positioned below the second chamfered surface and connecting the second chamfered surface with the surface of the anvil roller, the first chamfered surface having a first length and wherein a cross-section of the first chamfered surface is linear over the entire length of the first chamfered surface, the second chamfered surface having a second length and wherein a cross-section of the second chamfered surface is also linear over the length of the second chamfered surface, and wherein the first chamfered surface has a first edge and a second edge, the first edge being adjacent to the top surface while the second edge being adjacent to the second chamfered surface, and wherein the first chamfered surface is at a first angle of from about 5° to about 45° to a horizontal plane and the second chamfered surface is at a second angle of from about 40° to about 75° to a horizontal plane and wherein the first angle is less than the second angle, and wherein the top surface of the facetted impression element has a surface area of less than about 3 mm$^2$, and wherein the first length is less than the second length.

* * * * *